United States Patent
Matalon et al.

(10) Patent No.: US 9,322,482 B2
(45) Date of Patent: Apr. 26, 2016

(54) TEMPERATURE COMPENSATING FLANGED JOINT FOR A TEFLON DIAPHRAGM VALVE

(75) Inventors: Louis E. Matalon, Lancaster, PA (US); Ronald G. Butler, Mountville, PA (US)

(73) Assignee: ITT MANUFACTURING ENTERPRISES LLC., Wilmington, DE (US)

( * ) Notice: Subject to any disclaimer, the term of this patent is extended or adjusted under 35 U.S.C. 154(b) by 221 days.

(21) Appl. No.: 13/554,541

(22) Filed: Jul. 20, 2012

(65) Prior Publication Data

US 2014/0021391 A1 Jan. 23, 2014

(51) Int. Cl.
| | |
|---|---|
| F16K 31/00 | (2006.01) |
| F16K 1/00 | (2006.01) |
| F16K 15/00 | (2006.01) |
| F16K 5/14 | (2006.01) |
| F16K 7/12 | (2006.01) |

(52) U.S. Cl.
CPC .. *F16K 5/14* (2013.01); *F16K 7/126* (2013.01)

(58) Field of Classification Search
CPC ............. F16K 7/12; F16K 7/126; F16K 7/16; F16K 7/17; F16K 7/20
USPC ......... 251/61.1, 61.2, 128, 331, 335.2, 335.3, 251/368; 137/859; 277/315, 389, 391, 634
See application file for complete search history.

(56) References Cited

U.S. PATENT DOCUMENTS

| | | |
|---|---|---|
| 195,596 A | 9/1877 | Fenn et al. |
| 1,609,813 A | 12/1926 | Gorman |
| 1,992,043 A | 2/1935 | Saunders |
| 2,388,989 A | 11/1945 | Mueser |
| 2,504,057 A | 4/1950 | Trefil |
| 2,582,996 A | 1/1952 | Laurent |
| 2,410,629 A | 6/1955 | Price |
| 2,717,757 A | 9/1955 | Bowlzer |

(Continued)

FOREIGN PATENT DOCUMENTS

| | | | |
|---|---|---|---|
| DE | 3447329 | 7/1986 | |
| DE | 10058274 A1 * | 5/2002 | .............. F04B 43/00 |

(Continued)

OTHER PUBLICATIONS 2 pgs. JPH0193674 English Language Abstract.

(Continued)

*Primary Examiner* — John K Fristoe, Jr.
*Assistant Examiner* — Hailey K Do

(57) ABSTRACT

Apparatus, including a diaphragm valve, is provided featuring a valve body, a diaphragm, a pressure ring, and at least one elastomeric member. The valve body may include a circumferential flange. The diaphragm may include a circumferential gasket portion configured to be seated on the circumferential flange so as to form a joint between the valve body and the diaphragm. The pressure ring may include concentric fluctuations, and may be configured to apply a sealing force against the joint so that the concentric fluctuations prevent radial movement of the circumferential gasket portion and the circumferential flange. The elastomeric member may be configured to respond to a compressive force and provide a substantially constant sealing force, transmitted through the pressure ring, regardless of small variations in the thickness or material dimensions of the circumferential gasket portion caused by temperature fluctuation or material flow and age.

20 Claims, 2 Drawing Sheets

(56) References Cited

U.S. PATENT DOCUMENTS

| | | |
|---|---|---|
| 2,872,935 A | 2/1959 | Kenney |
| 3,026,852 A | 3/1962 | Stelzer |
| 3,067,764 A | 12/1962 | Geary |
| 3,148,861 A | 9/1964 | McFarland, Jr. |
| 3,204,919 A | 9/1965 | Tripoli et al. |
| 3,257,095 A | 6/1966 | Siver |
| 3,349,795 A | 10/1967 | Matsutani |
| 3,521,667 A | 1/1968 | Johnson |
| 3,561,480 A | 2/1971 | Fairchild |
| 3,631,882 A | 1/1972 | White, Jr. |
| 3,811,649 A | 5/1974 | Press et al. |
| 3,982,729 A | 9/1976 | Tricini |
| 4,014,514 A | 3/1977 | Priese et al. |
| 4,026,513 A | 5/1977 | Callenberg |
| 4,077,605 A | 3/1978 | Kutz et al. |
| 4,214,604 A | 7/1980 | Rumsey |
| 4,231,549 A | 11/1980 | Visalli |
| 4,295,485 A | 10/1981 | Waterfield |
| 4,452,428 A | 6/1984 | Scaramucci |
| 4,498,798 A | 2/1985 | Day |
| 4,746,095 A | 5/1988 | Roush |
| 4,750,709 A | 6/1988 | Kolenc et al. |
| 5,029,813 A | 7/1991 | Walton et al. |
| 5,295,662 A | 3/1994 | Yamaji et al. |
| 5,411,350 A | 5/1995 | Breault |
| 5,551,477 A | 9/1996 | Kanno et al. |
| 5,597,184 A | 1/1997 | Brenes et al. |
| 5,624,102 A | 4/1997 | Nishimura et al. |
| 5,669,418 A * | 9/1997 | Wode .................. 137/859 |
| 5,669,596 A | 9/1997 | Yoshikawa et al. |
| 6,007,045 A | 12/1999 | Heiniger et al. |
| 6,056,003 A | 5/2000 | Madsen et al. |
| 6,123,315 A | 9/2000 | Keller |
| 6,155,535 A | 12/2000 | Marcilese |
| 6,227,520 B1 | 5/2001 | Huber, Jr. |
| 6,296,227 B1 | 10/2001 | Burcham et al. |
| 6,443,426 B1 | 9/2002 | Brenes |
| 6,845,959 B2 | 1/2005 | Berckenhoff et al. |
| 6,948,517 B2 * | 9/2005 | Fukano et al. .......... 137/312 |
| 7,059,584 B2 | 6/2006 | Balasurbamanian |
| 7,377,483 B2 | 5/2008 | Iwabuchi et al. |
| 7,527,241 B2 * | 5/2009 | Lodolo ................ 251/331 |
| 7,628,376 B2 | 12/2009 | Masamura et al. |
| 7,789,012 B2 | 9/2010 | Marcilese et al. |
| 7,815,169 B2 | 10/2010 | Arosio |
| 8,056,578 B2 | 11/2011 | Lopp et al. |
| 8,616,525 B2 * | 12/2013 | Franz et al. ........... 251/331 |
| 2005/0045847 A1 | 3/2005 | Powell |
| 2009/0146095 A1 * | 6/2009 | Baril .................. 251/331 |
| 2011/0031427 A1 * | 2/2011 | Sitnikov ............ 251/335.2 |
| 2011/0114868 A1 * | 5/2011 | Warren et al. ........ 251/331 |
| 2012/0061597 A1 | 3/2012 | Speer |
| 2012/0068102 A1 * | 3/2012 | Anagnos et al. ...... 251/366 |
| 2012/0119130 A1 * | 5/2012 | Reed et al. ......... 251/335.2 |

FOREIGN PATENT DOCUMENTS

| | | |
|---|---|---|
| DE | 102009023002 | 12/2010 |
| EP | 0023409 | 2/1981 |
| EP | 0099945 | 2/1984 |
| EP | 0870957 | 10/1998 |
| EP | 1138989 | 10/2001 |
| EP | 2064468 | 7/2011 |
| FR | 511989 | 1/1921 |
| GB | 794992 | 5/1958 |
| GB | 685935 | 1/1965 |
| GB | 1011970 | 12/1965 |
| GB | 1080902 | 8/1967 |
| GB | 2173882 | 10/1986 |
| GB | 2460227 | 11/2009 |
| IL | 35178 | 4/1973 |
| JP | H0193674 | 4/1989 |
| JP | 2004204977 | 7/2004 |
| JP | 2008190546 | 8/2008 |
| WO | 9500782 | 1/1995 |
| WO | 9717558 | 5/1997 |
| WO | 2011014436 | 2/2011 |

OTHER PUBLICATIONS 1 pg JP2008190546 English Language Abstract.
1 pg EP0870957 English Language Abstract.
1 pg DE3447329 English Language Abstract.
2 pgs JP2004204977 English Language Abstract.
English Language Abstract WO2008034686 (1 page).
1 page DE102009023002 English Language Abstract.

* cited by examiner

TEMPERATURE COMPENSATING FLANGED JOINT FOR A TEFLON DIAPHRAGM VALVE

BACKGROUND OF THE INVENTION

1. Field of the Invention

The present invention relates to a diaphragm valve; and more particularly relates to a weir-type diaphragm valve.

2. Brief Description of Related Art

Temperature variation and cold flow of plastic diaphragms, typically Teflon, has historically led to leaks of process media through the joint between the diaphragm and valve body. An elastomeric member, typically included in the joint to provide compensation for these variations is inadequate to prevent leakage over long periods or multiple temperature cycles.

Low friction coefficient of TEFLON® (Polytetrafluoroethylene or PTFE) material allows the diaphragm to slide between the mating flanges, radially, when the valve is cycled and thus carry process media into the crevice between the plastic diaphragm and the valve body flange.

SUMMARY OF THE INVENTION

According to some embodiments, the present invention may take the form of apparatus, including a diaphragm valve, that includes a valve body, a diaphragm, a pressure ring, and at least one elastomeric member. The valve body may include a circumferential flange. The diaphragm may include a circumferential gasket portion configured to be seated on the circumferential flange so as to form a joint between the valve body and the diaphragm. The pressure ring may include a pressure ring flange having concentric fluctuations, and may be configured to apply a sealing force against the joint so that the concentric fluctuations prevent radial movement of the circumferential gasket portion and the circumferential flange. At least one elastomeric member may be configured to respond to a compressive force and provide a substantially constant sealing force, transmitted through the pressure ring, regardless of small variations in the thickness or material dimensions of the circumferential gasket portion caused by temperature fluctuation or material flow and age.

Embodiments of the present invention may also include one or more of the following features:

At least one elastomeric member may be a metallic spring configured to maintain the substantially constant sealing force through a lifetime of thermal cycles.

The circumferential gasket portion may be made of plastic, including TEFLON®.

At least one elastomeric member may be a Belleville washer.

The concentric fluctuations may include concentric serrations configured to penetrate the circumferential gasket portion of the diaphragm for substantially minimizing cold-flow and preventing radial movement of the circumferential gasket portion and the circumferential flange.

The concentric fluctuations may include a wave, a radius, or a flat geometric cross-section that does not have to penetrate the circumferential gasket portion of the diaphragm to provide the substantially constant sealing force and radial clamp.

The pressure ring may be configured with a substantially circular sealing track.

The pressure ring may be configured with a non-circular track, including a substantially oval sealing track.

The diaphragm may be may be made of TEFLON® in its entirety.

The diaphragm may be made of laminated composite materials, including TEFLON® laminated to ethylene propylene diene monomer (EPDM) with fabric.

The valve body may include a fluid flow channel configured with a weir portion to control a flow of fluid through the fluid flow channel.

In effect, the present invention provides a substantially constant sealing force upon a plastic, typically TEFLON®, "gasket" section of the diaphragm by means of one or more metallic springs, regardless of variations in material dimensions caused by temperature fluctuation or material cold-flow (creep). The present invention also prevents radial movement of the TEFLON® "gasket" section by means of concentric fluctuations in the otherwise flat surface of the upper sealing member.

In operation, the concentric serrated edge on the live-loaded pressure ring penetrates the TEFLON® diaphragm minimizing cold-flow and preventing radial movement of the TEFLON®. The one or more Belleville washers or other mechanical spring(s) exert a relatively constant force, transmitted through the pressure ring, regardless of the small variations in thickness of the diaphragm that can be caused by temperature variation or material flow and age.

In addition to the concentric serrations, other geometry cross sections of the pressure ring can enhance the seal against the diaphragm face, including a wave, a radius, or flat, and do not have to penetrate the diaphragm to achieve the seal and radial clamp. The pressure ring may include a circular track to simplify manufacturing; however, other types or kinds of shapes, such as an oval, or more complex shapes, to the seal track are possible according to the present invention. Diaphragm materials other than TEFLON® may also be used with the present invention, including laminated composite materials such as TEFLON® laminated to EPDM with fabric. Other metal springs may be used in place of the Belleville washer to maintain the desired force through a lifetime of thermal cycles. The spring may be located as shown herein, deep in the bonnet, or close to the bonnet seal, or even adjacent to the diaphragm seal.

BRIEF DESCRIPTION OF THE DRAWING

The drawing includes the following Figures, not necessarily drawn to scale.

Figure 1:
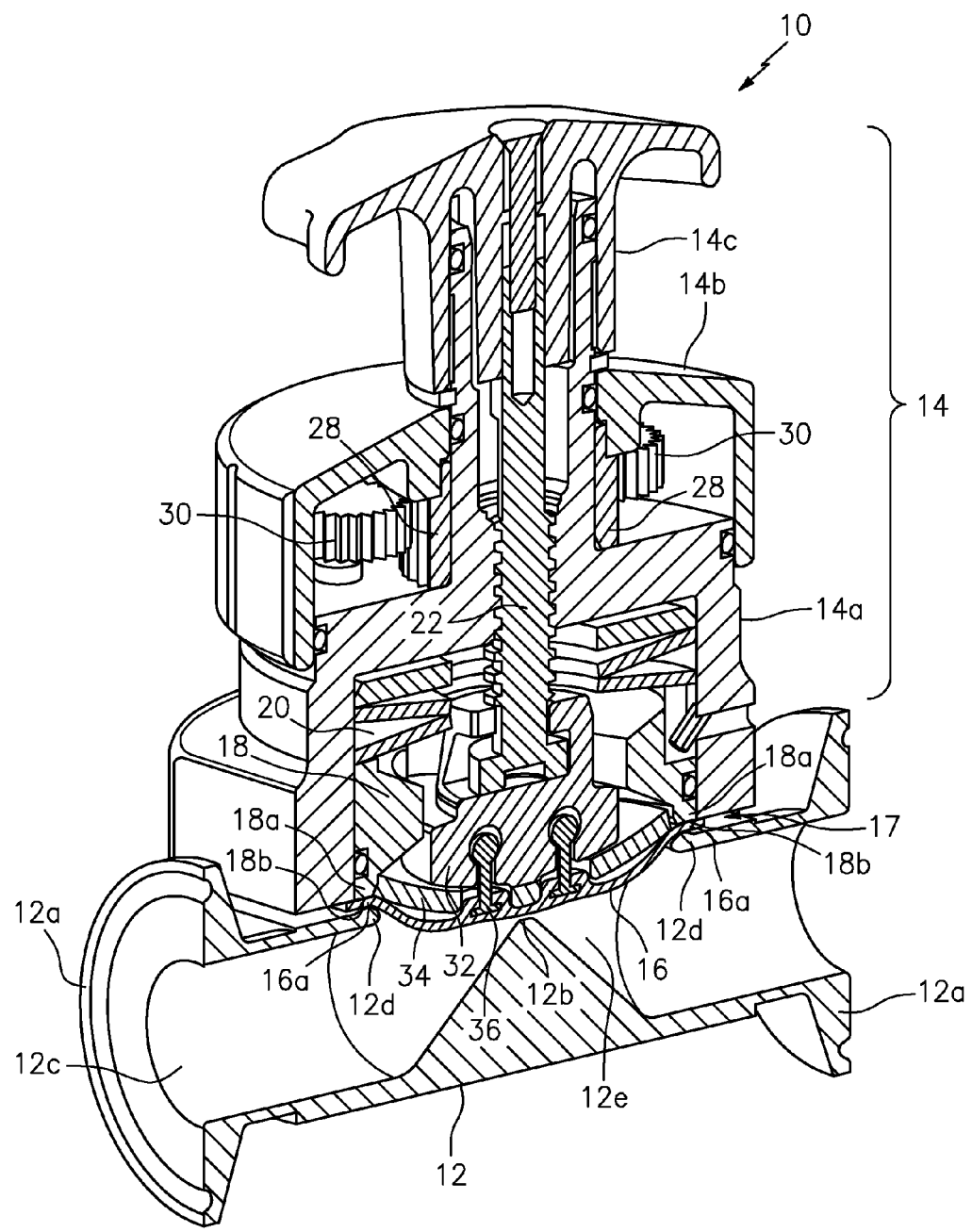
FIG. 1 is a cross-sectional sketch of a Weir diaphragm valve through a valve center, and perpendicular to its weir portion, according to some embodiments of the present invention. (It is understood that many of the featured items shown therein are axially symmetric.)

In the following description of the exemplary embodiment, reference is made to the accompanying Figures in the drawing, which form a part hereof, and in which are shown by way of illustration of an embodiment in which the invention may be practiced. It is to be understood that other embodiments may be utilized, as structural and operational changes may be made without departing from the scope of the present invention.

DETAILED DESCRIPTION OF THE INVENTION

Figure 2:
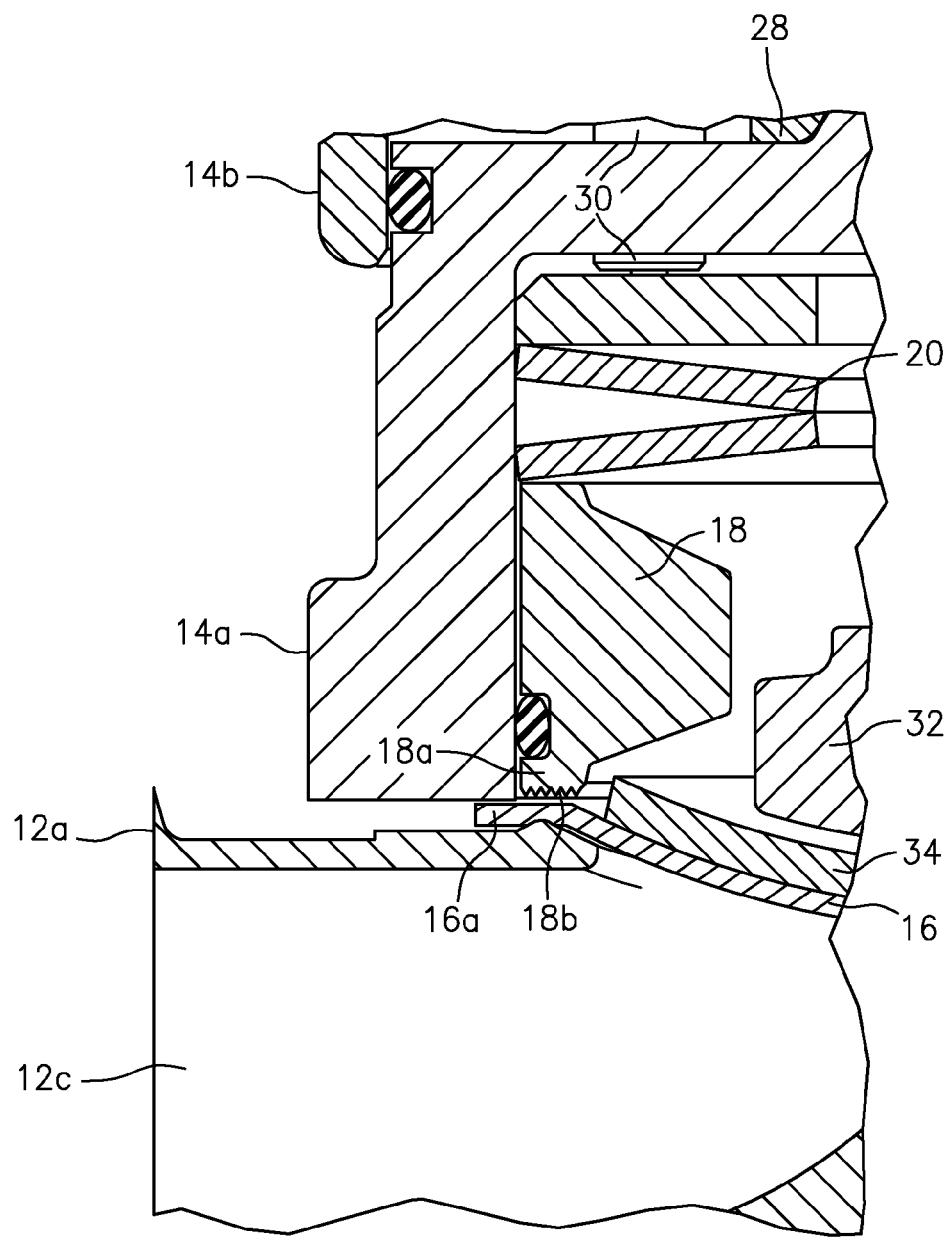
FIG. 2 is an exploded view of part of the Weir diaphragm valve shown in FIG. 1, according to some embodiments of the present invention.

FIGS. 1-2 shows apparatus, in the form of a diaphragm valve, generally indicated as 10 according to some embodiments of the present invention, having a valve body 12 and a bonnet assembly 14. The bonnet assembly 14 is configured with a diaphragm 16, a pressure ring 18 and at least one elastomeric member 20. As a person skilled in the art would appreciate, the bonnet assembly 14 is also configured with other elements that do not form part of the underlying invention set forth herein, are described in detail herein, but that are described in corresponding U.S. Pat. No. 9,157,534, which is hereby incorporated by reference in its entirety.

The valve body 12 may include input/output ports 12a, a weir portion 12b, a fluid flow channel 12c, a circumferential flange 12d configured around, and forming an opening generally indicated by an arrow labeled 12e. The weir portion 12b is configured to control a flow of fluid through the fluid flow channel 12c. The weir portion 12b is understood, and known in the art, as a dam-like portion that is raised and extended across the fluid flow channel 12c, and typically forms part of a Weir-type diaphragm valve. The circumferential flange 12d is configured to extend around the opening 12e and the weir portion 12b raised therein. The scope of the invention is described in relation to a weir-type diaphragm valve, but is also intended to include other types or kinds of diaphragm valves, either now known or later developed in the future.

The diaphragm 16 may include a circumferential gasket portion 16a configured to be seated on the circumferential flange 12d of the valve body 12 so as to form a joint generally indicated by an arrow labeled 17 between the valve body 12 and the diaphragm 16. The circumferential gasket portion 16a may be made of plastic, including TEFLON®, as well as being made of laminated composite materials, including TEFLON® laminated to ethylene propylene diene monomer (EPDM) with fabric. The scope of the invention is also intended to include the diaphragm 16 being made from other types or kinds of material, or combinations of material, either now known or later developed in the future.

The pressure ring 18 may include a circumferential pressure ring flange 18a having concentric fluctuations 18b, and may be configured to apply a sealing force against the joint 17 so that the concentric fluctuations 18b prevent radial movement of the circumferential gasket portion 16a of the diaphragm 16 and the circumferential flange 12d of the valve body 12. The concentric fluctuations 18b may include, or take the form of, concentric serrations, consistent with that shown in FIGS. 1-2, configured to penetrate the circumferential gasket portion 16a of the diaphragm 16 for substantially minimizing cold-flow and preventing radial movement of the circumferential gasket portion 16a and the circumferential flange 12d. The concentric fluctuations may also include, or take the form of, a wave, a radius, or a flat geometric cross-section that does not penetrate the circumferential gasket portion 16a of the diaphragm 16 to provide the substantially constant sealing force and radial clamp in relation to the circumferential flange 12d. The pressure ring 18 may be configured with, or take the form of, a substantially circular sealing track, consistent with that shown in FIG. 1. The scope of the invention is also intended to include the pressure ring 18 being configured with a non-circular track, including a substantially oval sealing track.

The at least one elastomeric member 20 may be configured to respond to a compressive force, e.g., provided via gear-headed screws 30, and provide a substantially constant sealing force, transmitted through the pressure ring 18, regardless of small variations in the thickness or material dimensions of the circumferential gasket portion 16a caused by temperature fluctuation or material flow and age. The scope of the invention is not intended to be limited to the technique for providing the compressive force via the gear-headed screws 30, and may include the techniques consistent with that set forth in the aforementioned corresponding U.S. Pat. No. 9,157,534, by way of example, as well as other techniques either now known or later developed in the future.

The at least one elastomeric member 20 may be a metallic spring, consistent with that shown in FIGS. 1-2, configured to maintain the substantially constant sealing force through a lifetime of thermal cycles. The at least one elastomeric member may be, or take the form of, a Belleville washer. A Belleville washer is known in the art, may also be known or referred to as a coned-disc spring, may take the form of a conical spring washer, disc spring, Belleville spring or cupped spring washer, and is a type of spring shaped like a washer. It may include a frusto-conical shape which gives the washer a spring characteristic.

Other Features, Parts or Elements of the Weir Diaphragm

The bonnet assembly 14 includes a lower bonnet member 14a, an upper bonnet member or gear cover 14b and a knob 14c. The gear cover 14b is attached to a central gear 28, which rotates with it. The central gear 28 will turn multiple gear-headed screws 30. In the diaphragm valve 10 shown in FIG. 1, there are three such gear-headed screws 30, two of which are shown in FIG. 1. The gear-headed screws 30 apply the compressive force in order to compress the one or more elastomeric members 20, consistent with that described in U.S. Pat. No. 9,016,307, which is hereby incorporated by reference in its entirety. The one or more elastomeric members 20 drive the pressure ring 18 and cause it to apply the sealing force against the joint 17 so that the concentric fluctuations 18b prevent radial movement of the circumferential gasket portion 16a of the diaphragm 16 and the circumferential flange 12d of the valve body 12, again consistent with that described in the aforementioned corresponding U.S. Pat. No. 9,016,307.

The bonnet assembly 14 also includes a compressor 32, an elastomeric member 34 and pins or studs 36, which cooperate with the spindle 22 in order to providing sealing contact between the diaphragm 16 and the weir portion 12b of the valve body, consistent with that that described in the aforementioned corresponding U.S. Pat. No. 9,157,534, which is also hereby incorporated by reference in its entirety. The bonnet assembly 14 also includes various O-rings between various parts for the purpose of sealing, which do not form part of the underlying invention, and thus are not labeled or described in detail.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:
1. A weir-type diaphragm valve, comprising:
a valve body having a circumferential flange;
a bonnet assembly having an upper bonnet member or gear cover configured to rotate a central pear and apply a compressive force;

a diaphragm having a circumferential gasket portion configured to be seated on the circumferential flange so as to form a joint between the valve body and the diaphragm, at least the circumferential gasket portion being made of plastic, including polytetrafluoroethylene;

a pressure ring having a pressure ring flange with concentric serrations, and being configured to apply a sealing force against the joint so that the concentric serrations penetrate the circumferential gasket portion of the diaphragm for substantially minimizing cold-flow and preventing radial movement of the circumferential gasket portion and the circumferential flange; and at least one elastomeric member configured to respond to the compressive force and provide a substantially constant sealing force, transmitted through the concentric serrations of the pressure ring, regardless of small variations in the thickness or material dimensions of the circumferential gasket portion of the diaphragm caused by temperature fluctuation or material flow and age.

2. A weir-type diaphragm valve according to claim 1, wherein the at least one elastomeric member is a metallic spring configured to maintain the substantially constant sealing force through lifetime thermal cycles.

3. A weir-type diaphragm valve according to claim 1, wherein the at least one elastomeric member is a Belleville washer.

4. A weir-type diaphragm valve according to claim 1, wherein the concentric serrations comprise a concentric serrated edge configured to penetrate the circumferential gasket portion of the diaphragm.

5. A weir-type diaphragm valve according to claim 1, wherein the pressure ring is configured with a substantially circular sealing track.

6. A weir-type diaphragm valve according to claim 1, wherein the pressure ring is configured with a non-circular track, including a substantially oval sealing track.

7. A weir-type diaphragm valve according to claim 1, wherein the diaphragm is made of polytetrafluoroethylene in its entirety.

8. A weir-type diaphragm valve according to claim 1, wherein the valve body has a fluid flow channel configured with a weir portion to control a flow of fluid through the fluid flow channel.

9. A weir-type diaphragm valve according to claim 1, wherein the diaphragm is made of laminated composite materials, including polytetrafluoroethylene laminated to a rubber or elastomeric material with fabric.

10. A weir-type diaphragm valve according to claim 9, wherein the rubber or elastomeric material is an ethylene propylene diene monomer (EPDM).

11. A weir-type diaphragm valve according to claim 1, wherein
   the bonnet assembly comprises a lower bonnet member;
   the pressure ring is configured inside the lower bonnet member; and
   the at least one elastomeric member is configured inside the lower bonnet member;
   the upper bonnet member or gear cover is configured to apply the compressive force in order to compress the at least one elastomeric member inside the lower bonnet member.

12. A weir-type diaphragm valve according to claim 11, wherein
   the upper bonnet member or gear cover comprises multiple gear-headed screws; and
   the upper bonnet member or gear cover is attached to the central gear which rotates and turns the multiple gear-headed screws that apply the compressive force in order to compress the at least one elastomeric member inside the lower bonnet member.

13. A weir-type diaphragm valve, comprising:
   a valve body having a circumferential flange;
   a bonnet assembly having an upper bonnet member or gear cover and a lower bonnet member, the upper bonnet member or gear cover comprises a central gear and multiple gear-headed screws, the upper bonnet member or gear cover being attached to the central gear which rotates and turns the multiple gear-headed screws that apply a compressive force;
   a diaphragm having a circumferential gasket portion configured to be seated on the circumferential flange so as to form a joint between the valve body and the diaphragm, at least the circumferential gasket portion being made of plastic, including polytetrafluoroethylene;
   a pressure ring configured inside the lower bonnet member and having a pressure ring flange with concentric serrations, and being configured to apply a sealing force against the joint so that the concentric serrations penetrate the circumferential gasket portion of the diaphragm for substantially minimizing cold-flow and preventing radial movement of the circumferential gasket portion and the circumferential flange; and
   at least one elastomeric member configured inside the lower bonnet member to respond to the compressive force and provide a substantially constant sealing force, transmitted through the concentric serrations of the pressure ring, regardless of small variations in the thickness or material dimensions of the circumferential gasket portion of the diaphragm caused by temperature fluctuation or material flow and age.

14. A weir-type diaphragm valve according to claim 13, wherein
   the valve body comprises input/output ports, a weir portion, a fluid flow channel; and
   the bonnet assembly comprises a combination of a knob, a spindle, a compressor, a corresponding elastomeric member and pins or studs, which cooperate in order to provide sealing contact between the diaphragm and the weir portion of the valve body to control a flow of fluid through the fluid flow channel.

15. A weir-type diaphragm valve according to claim 13, wherein the at least one elastomeric member is a metallic spring configured to maintain the substantially constant sealing force through lifetime thermal cycles.

16. A weir-type diaphragm valve according to claim 13, wherein the at least one elastomeric member is a Belleville washer.

17. A weir-type diaphragm valve according to claim 13, wherein the concentric serrations comprise a concentric serrated edge configured to penetrate the circumferential gasket portion of the diaphragm.

18. A weir-type diaphragm valve according to claim 13, wherein the pressure ring is configured with a substantially circular sealing track.

19. A weir-type diaphragm valve according to claim 13, wherein the pressure ring is configured with a non-circular track, including a substantially oval sealing track.

20. A weir-type diaphragm valve according to claim 13, wherein the diaphragm is made of polytetrafluoroethylene in its entirety.

* * * * *